United States Patent
Smith

(10) Patent No.: US 10,712,241 B2
(45) Date of Patent: Jul. 14, 2020

(54) SELF-ALIGNING, MAGNETICALLY RETAINED AIR SAMPLER ASSEMBLY COMPONENT

(71) Applicant: Shawn Smith, Grants Pass, OR (US)

(72) Inventor: Shawn Smith, Grants Pass, OR (US)

(73) Assignee: LIGHTHOUSE WORLDWIDE SOLUTIONS, INC., Fremont, CA (US)

( * ) Notice: Subject to any disclaimer, the term of this patent is extended or adjusted under 35 U.S.C. 154(b) by 299 days.

(21) Appl. No.: 15/469,465

(22) Filed: Mar. 24, 2017

(65) Prior Publication Data
US 2018/0275021 A1  Sep. 27, 2018

(51) Int. Cl.
*G01N 1/22* (2006.01)
(52) U.S. Cl.
CPC ..................... *G01N 1/22* (2013.01)
(58) Field of Classification Search
CPC ..................................................... G01N 1/22
See application file for complete search history.

(56) References Cited

U.S. PATENT DOCUMENTS

| | | | | |
|---|---|---|---|---|
| 6,565,638 | B1* | 5/2003 | Sugita | G01N 1/2273 73/28.05 |
| 2011/0298227 | A1* | 12/2011 | Fiedler | A45C 13/1069 292/251.5 |
| 2014/0286836 | A1* | 9/2014 | Clavaguera | G01N 1/2205 422/535 |

* cited by examiner

*Primary Examiner* — Xin Y Zhong
(74) *Attorney, Agent, or Firm* — Michael L. Grenenberg, Esq.; Greenberg & Lieberman, LLC

(57) ABSTRACT

An air sampler mechanism by which the entirety of the petri plate assembly of the air sampler may be easily removed without tools is described. The mechanism employs at least one magnet which is preferably disposed within the top plate assembly of the air sampler instrument. The magnets of the mechanism are configured to maintain the top plate assembly firmly in position during use while facilitating easy removal by an operator or manager. Indexing features are preferably present, which ensure proper alignment and positioning of the top plate assembly when reattached for use.

4 Claims, 6 Drawing Sheets

| Configurations for Magnetic Retention | Preferred Implementation | Alternative Implementation 1* | Alternative Implementation 2* |
|---|---|---|---|
| Component in Instrument | Magnet | Ferromagnetic Insert | Magnet |
| Component in Removable "Top Plate Assembly" | Ferromagnetic Insert | Magnet | Magnet |
| Depiction |  |  |  |

SELF-ALIGNING, MAGNETICALLY RETAINED AIR SAMPLER ASSEMBLY COMPONENT

FIELD OF THE PRESENT INVENTION

The present invention relates in general to air sampling systems, and more specifically relates to an apparatus facilitating a tool-free removal of the petri/agar plate assembly of an air sampler to expedite and facilitate cleaning and reset of said air sampler.

BACKGROUND OF THE PRESENT INVENTION

Microbial Air Samplers are used in cleanrooms and aseptic environments to assess the level of bio-contamination within a pharmaceutical or medical device production space.

Microbial samplers are a form of active monitoring, and are available in both remote and portable versions; most operate via the principal of impaction, in which air, at a decided flow rate, is drawn through a plate with a numbers of holes at a specified diameter. As the air passes through the holes, its velocity is accelerated directed upon the surface of a solid medium, such as agar; particles that are above a certain cutoff diameter at the impaction velocity have too much inertial to make the 80 degree corner and are impacted onto the collection surface. After a decided volume of air/gas has passed over the collection surface, the sample is ended and the collection surface/agar is removed for incubation. After the incubation period, the collection surface is inspected and the number of visible colony forming units is counted. The number and or type of colony forming units present on the incubated agar gives a quantitative assessment of the sterility of the air that was present in the manufacturing space during the time of sampling.

Agar media, a jelly like substance used to capture particles and microorganisms above the cutoff size, is available in many formulations with varying mixes of agar (obtained from algae) and other nutrients. The gel's porous nature and semi-rigid structure help slow the microbes down without killing them (decelerating too fast) while providing a growth medium for the captured microorganisms to flourish. Typically in air sampling applications, the agar media is contained within a petri dish/plate for easy handling and sample integrity; the petri plate and agar media combination are commonly referred to as an agar plate. Agar plates are produced in a range of sizes ranging from 35 mm to 150 mm in diameter, though most typically the 100 mm size is used for air samplers.

In use, a new sterile agar plate is placed into the instrument prior to beginning a sample. The operator must carefully install the petri plate into the sampler's respective petri plate holder while only making contact with the external surfaces of the petri dish lid. The lid is then removed (leaving only the agar plate), the impactor cover/plate is installed, and the pump is started to begin the sample period. After the sample is completed (determined by the unit flow rate and the total desired sample volume), the impactor cover/plate is removed and the operator uses the lid that was previously removed to grip the agar plate; again, being sure to only touch the external surfaces of the lid so as to not entrain any foreign microbes into the agar media. The agar plate is then taken to a controlled environment for incubation, in which the microbial content is allowed to germinate. After a pre-determined incubation period, the agar plate is removed and inspected for Colony Forming Units. The number and type of colony forming units observed growing in the agar media can then be used to determine the relative sterility of the process at the time of the agar plate's sampler period.

Typically, the only part of the viable sampler that comes into contact with the agar plate is the mechanism that holds and supports the petri dish during the sample. In most applications that will make use of a viable sampler, the mechanism that holds the agar plate will require cleaning and sterilization prior to the installation of a new sterile agar plate. It is advantageous, in terms of time reduction and process control, to facilitate easy and fast cleaning/sterilization of the entire viable sampler; this is particularly true of the component/s that hold and support the agar plate during sampling.

Thus, there is a need for a new mechanism or component by which the entirety of the petri plate, including the agar plate, may be easily removed without the need for tools or unnecessary contact or contamination. Such a device preferably employs at least one magnet disposed within the top plate assembly and/or the top of an air sampler to facilitate the secure attachment and detachment of the top plate assembly to and from the air sampler. Indexing or gradations are preferably present to ensure proper alignment of the top plate assembly during attachment of the top plate assembly to the air sampler (after cleaning or reset).

SUMMARY OF THE PRESENT INVENTION

This Summary of the Invention is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is a magnetic assembly mechanism for a microbial air sampler. The mechanism is equipped with magnets disposed within alignment pockets disposed on a top of the air sampler, and/or on feet of a top plate assembly, which facilitate easy and accurate attachment and detachment of the entirety of the top plate assembly, including the petri plate assembly containing the agar plate of conventional air samplers. Extensions are disposed on the feet of the assembly, which are configured to interlock within the alignment pockets disposed on the top of the air sampler, which are firmly held in position via the magnets.

The mechanism and apparatus of the present invention is preferably configured to accept a wide variety of petri plate and/or agar plate assembly diameters, and as such, is preferably equipped with adjustable mounts or brackets disposed on the outer circumference of the top plate assembly equipped with the mechanism of the present invention.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only.

BRIEF DESCRIPTION OF THE DRAWINGS

The present invention will be better understood with reference to the appended drawing sheets, wherein.

Figure 1:
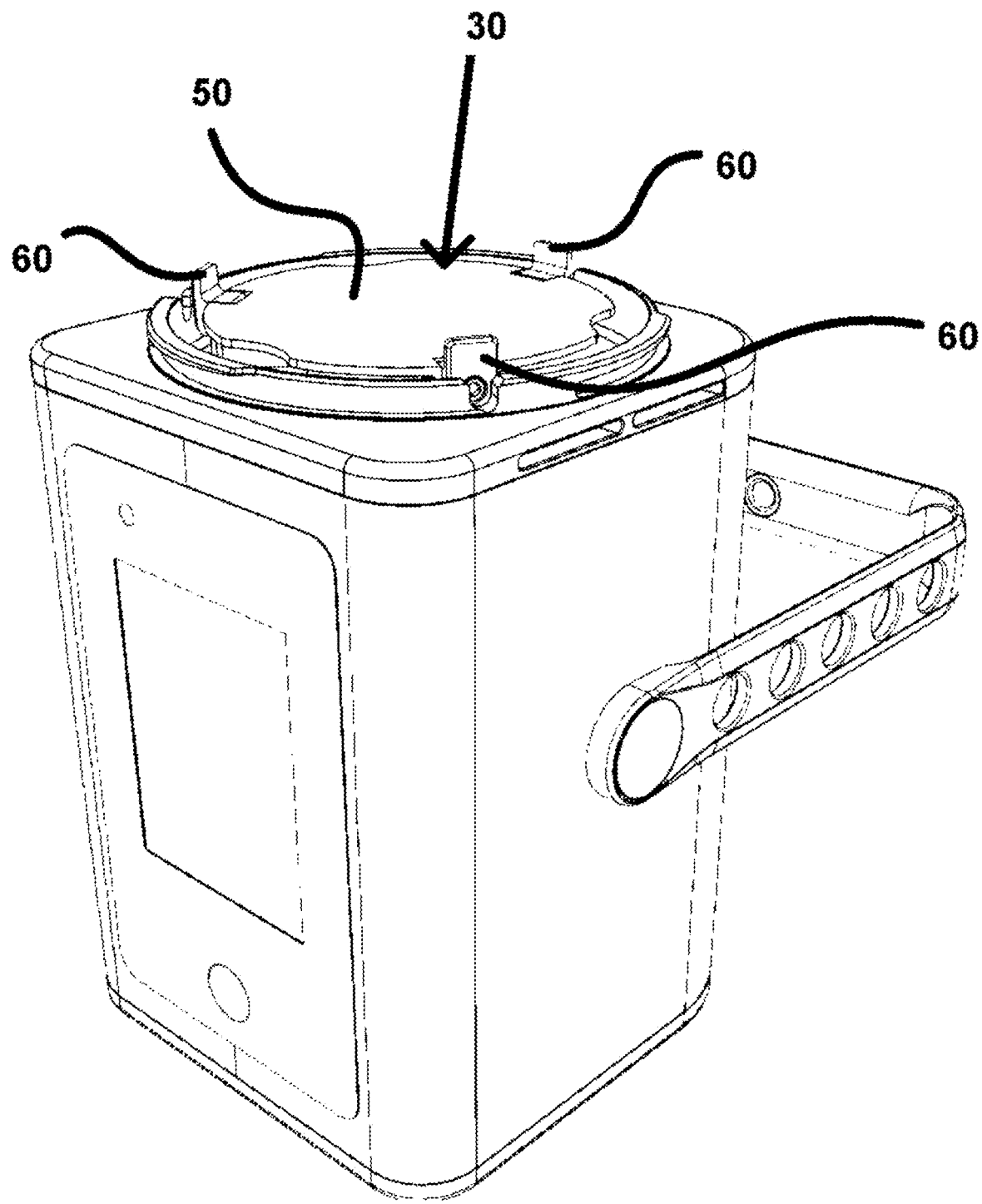
FIG. 1 shows a view of an embodiment of the present invention while affixed to an air sampler via at least one magnet.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENT

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure or characteristic. Moreover, such phrases are not necessarily referring to the same embodiment, Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 2:
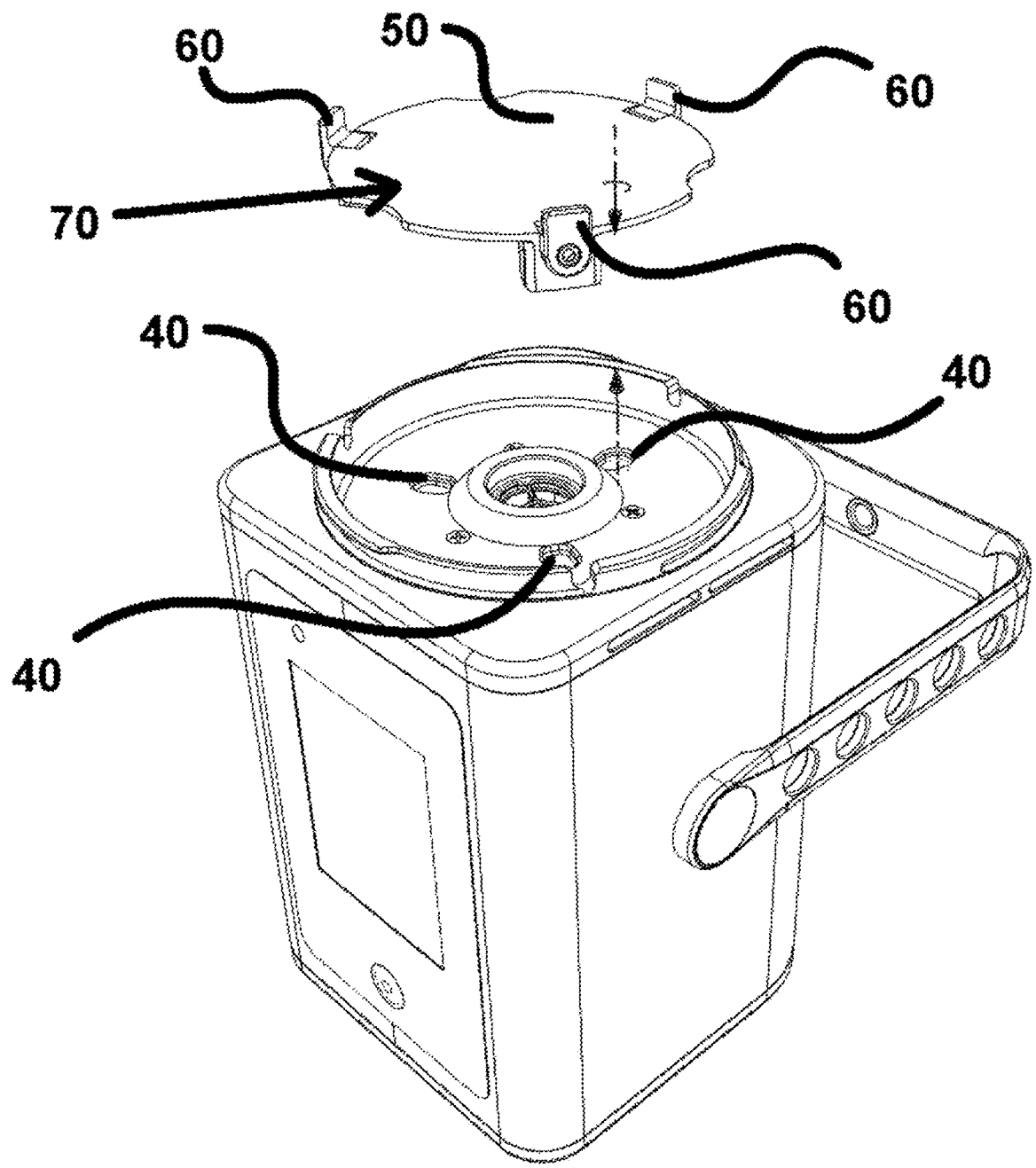
FIG. 2 shows a view of an embodiment of the present invention detached from the air sampler, showing ease of detachment without tools.
Figure 3:
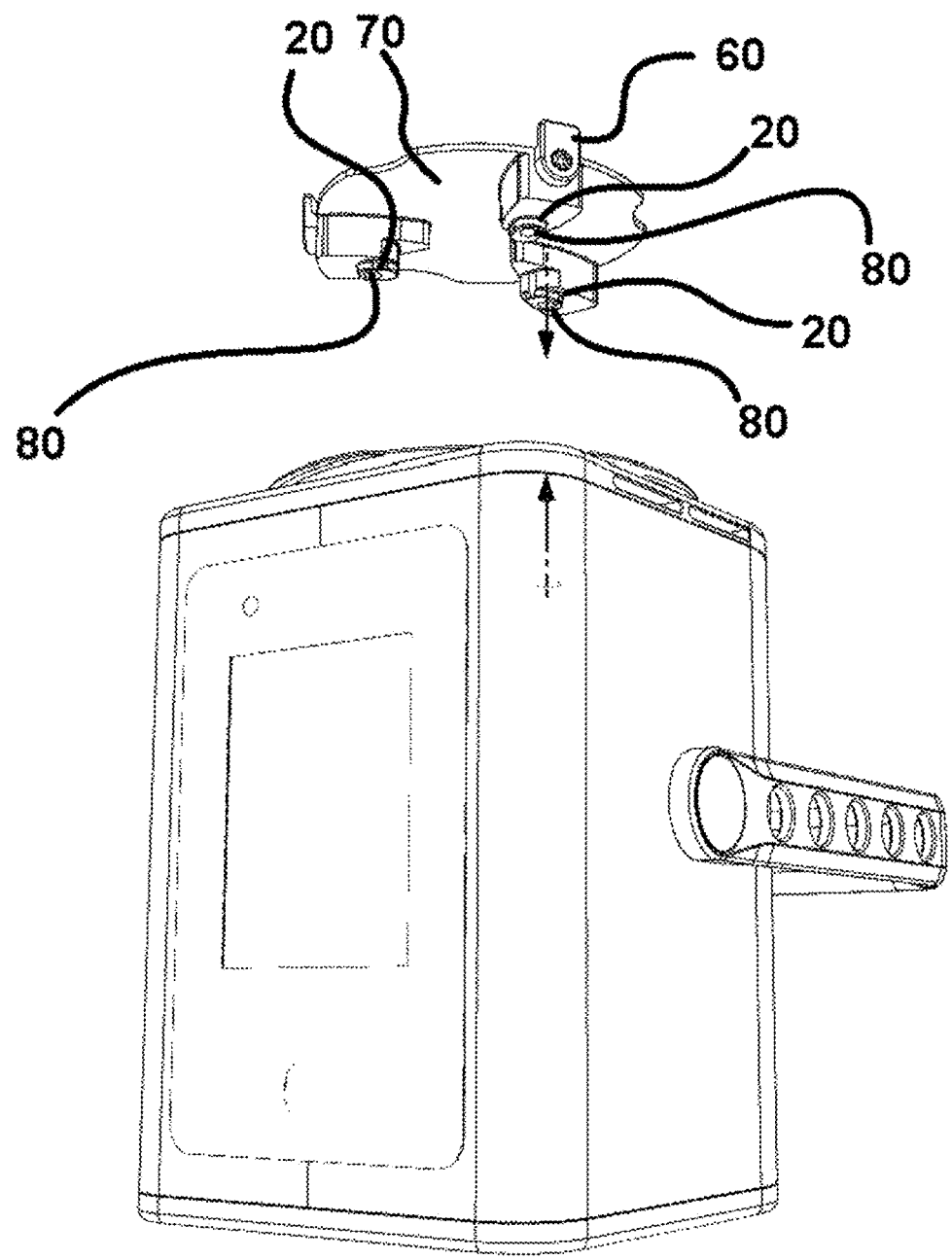
FIG. 3 shows a view of an embodiment of the bottom of the present invention, depicting the ferromagnetic inserts in the feet of the present invention.
Figure 4:
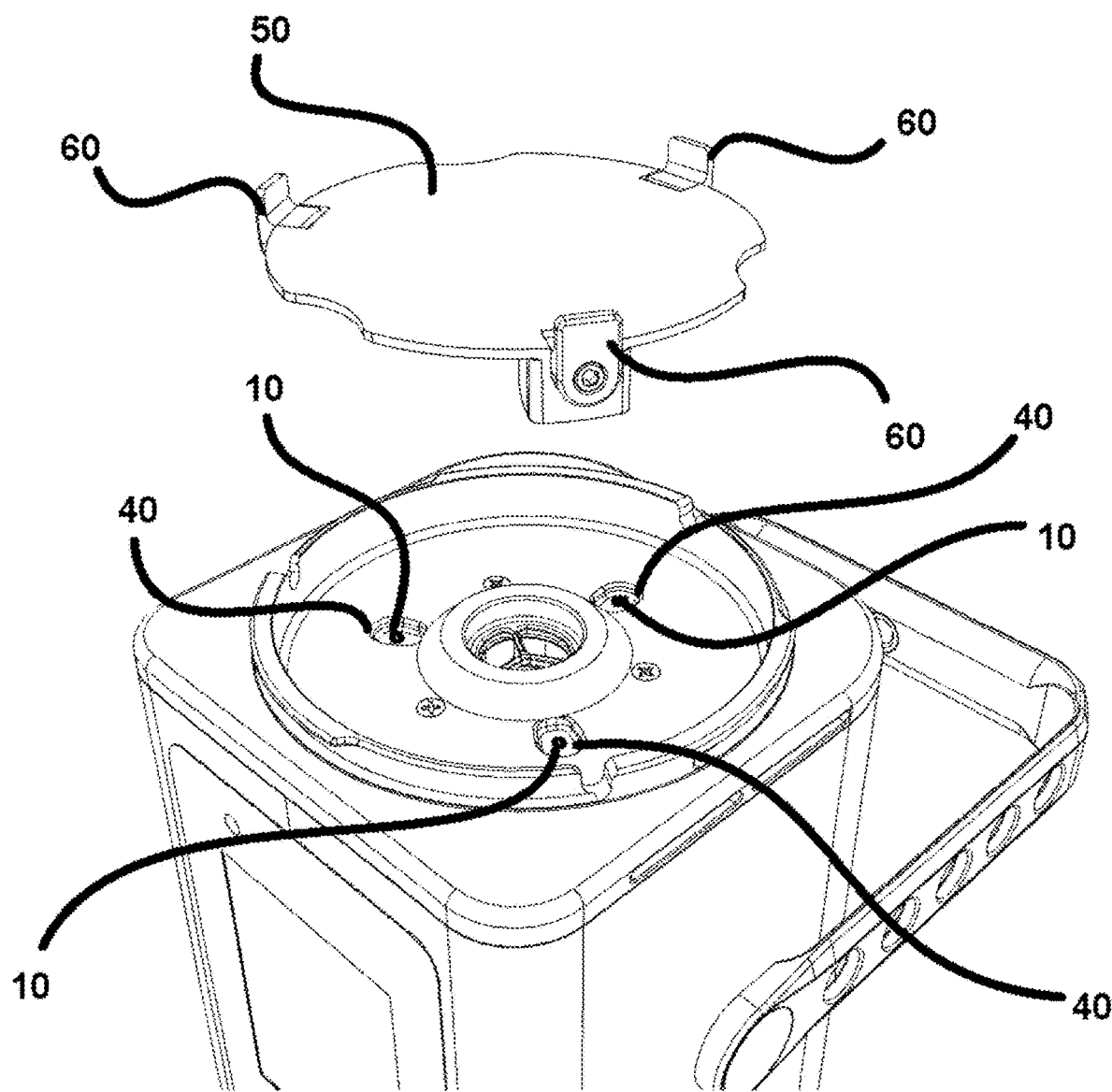
FIG. 4 displays a preferred embodiment of the present invention with magnets disposed within the alignment pockets.
Figure 5:
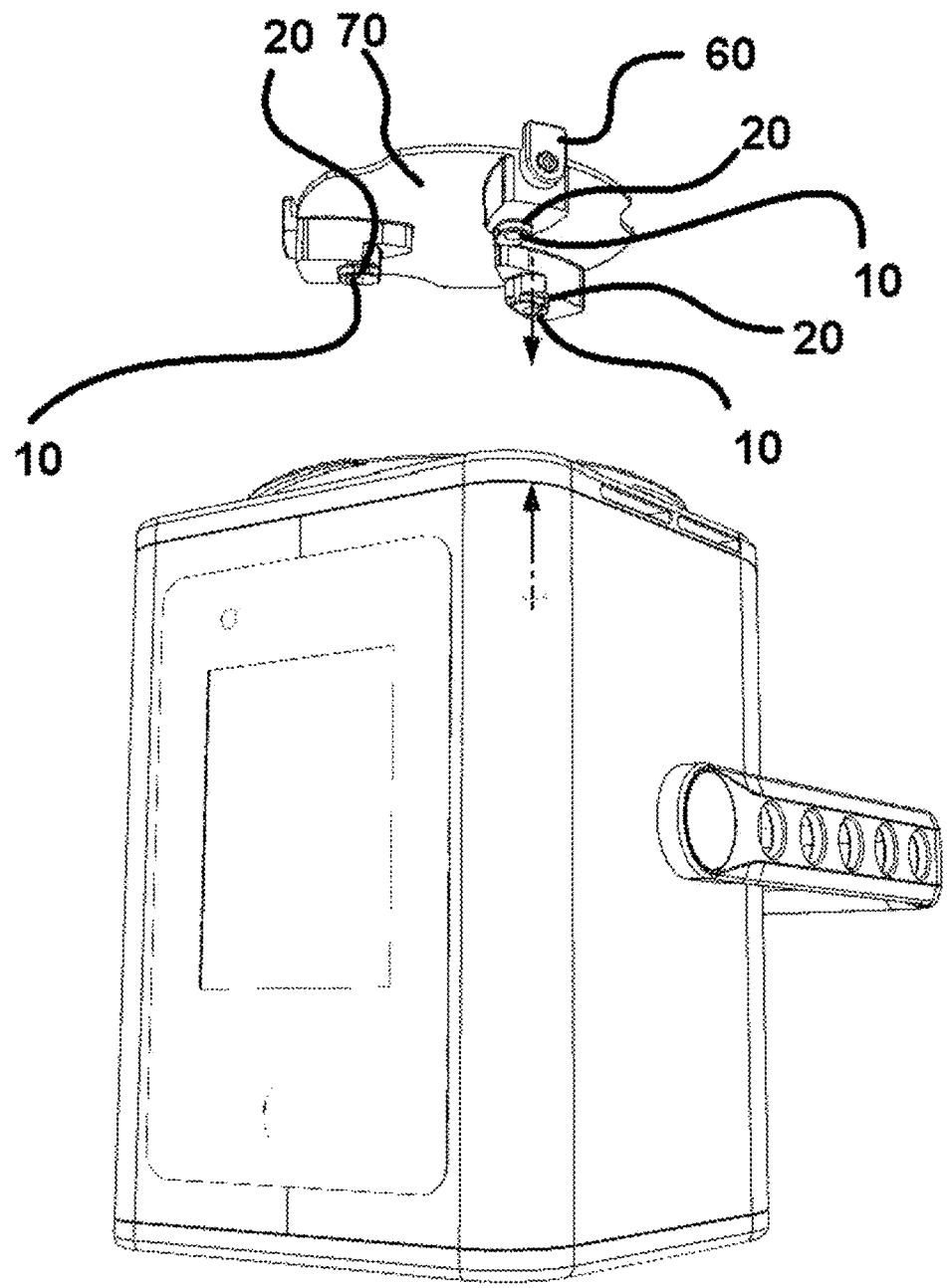
FIG. 5 displays an alternate preferred embodiment of the present invention, showing magnets disposed in the feet of the present invention.

The present invention is a mechanism and component by which the removal of the top plate assembly (50) of an air sampler may be easily removed without tools. The mechanism employs at least one magnet (10), which are preferably embedded within the top plate assembly (50) of the air sampler, or alternately embedded within the air sampler unit itself. In preferred embodiments of the present invention, there are preferably three magnets (10), as shown in FIG. 3. In one embodiment of the present invention, the magnets (10) are ensconced within feet (20), which protrude from the bottom (30) of the top plate assembly (50) of the air sampler. The feet (20) are configured to rest within alignment pockets (40) disposed atop the air sampler itself, as shown in FIG. 2. In other primary embodiments, the magnets (10) are disposed within the alignment pockets (40). The magnets (10) are preferably neodymium magnets, however it is envisioned that cobalt, alnico, ceramic, or ferritic magnets may alternately be used. Neodymium magnets are preferred, as they maximize the magnetic force available for retention of the top plate assembly to the air sampler in the correctly aligned and calibrated position.

The magnets (10) of the present invention ensure that the feet (20) remain firmly fixed within the alignment pockets (40) when the top plate assembly (50) is attached to the air sampler for use. Additionally, the alignment pockets (40) help to ensure that the reattachment of the top plate assembly (50) to the air sampler via the magnets (10) is consistent, such that the top plate assembly (50) is accurately positioned atop the air sampler every time, without the need for tools and adjustments. The alignment pockets (40) of the present invention aid in the alignment of the magnets (10) and ferromagnetic inserts (80) during initial installation of the top plate assembly. As such, the alignment pockets (40) act as the primary indexing feature of the present invention. Indexing is desired to ensure that the adjustable brackets (60) may be adjusted for the petri dish size at hand, without the top plate assembly moving laterally.

The feet (20) may be disposed such that they are in communication with adjustable brackets (60), which extend to a top (70) of the top plate assembly (50). The adjustable brackets (60) help to ensure the correct positioning of the petri plate atop the top plate assembly (50) of the present invention. As such, the adjustable brackets (60) are preferably adjustable to facilitate use of the top plate assembly (50) with agar plates of varying diameters.

In short, the present invention amounts to a modified top plate assembly for an air sampler, which employs magnets (10), rather than bolts, screws, or similar attachment means, to ensure the top plate remains in the correct calibrated position during use. The use of magnets (10) facilitates the removal of the entirety of the top plate assembly without the need for any additional tools, expediting and simplifying the top plate removal and reset process.

Alternate embodiments of the present invention may include variations on the sizing and shape of the alignment pockets (40), adjustable brackets (60), and feet (20). Additionally, the spacing and displacement of the feet (20) and alignment pockets (40) may vary with their application. Similarly, the number of feet (20), magnets (10), and alignment pockets (40) may also vary without venturing from the essence of the present invention. Additionally, some embodiments of the present invention may employ brackets (60) which are fixed in position for instances where a consistently sized agar plate is employed. It should be understood that the adjustable brackets (60) of the present invention amount to petri dish retainers which are configured to securely hold a petri dish/agar plate assembly atop the top plate such that it may not move laterally.

It is envisioned that the entirety of the top plate assembly may be autoclaved for sterilization. As such, in preferred embodiments of the present invention, the magnets (10) are preferably disposed within the alignment pockets (40) of the top of the air sampler (as opposed to within the feet (20) as taught in other embodiments) so as to prevent magnetic degradation from heat via autoclave. In such embodiments, ferromagnetic inserts (80) are preferably disposed within the feet (20) to facilitate a strong and secure magnetic association with the magnets (10) disposed within the alignment pockets (40) of the present invention. The ferromagnetic inserts (80) of the present invention are preferably of a solenoid grade 430R/430FR stainless steel, however other forms or compositions of ferromagnetic inserts (80) may be employed.

Figure 6:
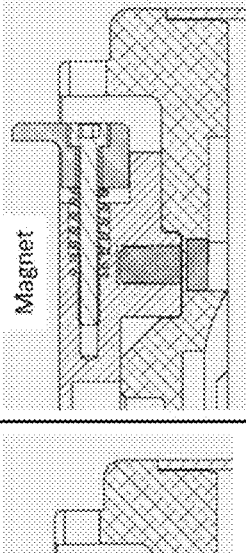
FIG. 6 depicts a chart showing the potential arrangements of the magnets and ferromagnetic inserts of the present invention.
Figure 6:
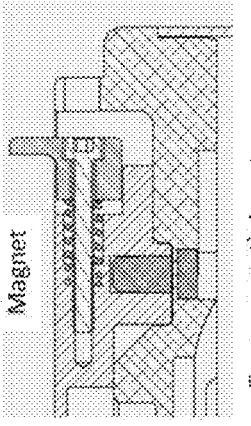
Figure 6:
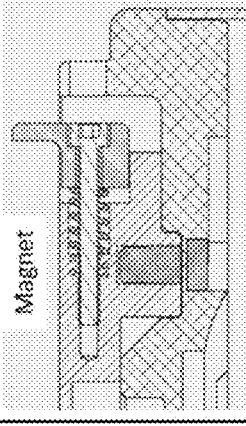

To clarify the preferred embodiments of the present invention, including the multiple means by which the top plate assembly may be securely mated to the top of the air sampler via feet (20) and alignment pockets (40), the chart shown in FIG. 6 may be referenced.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

I claim:

1. A component for a top plate of a microbial air sampler comprising:
   feet, said feet disposed on a bottom of the top plate;
   wherein the top plate is configured to hold a sampling plate;
   at least three brackets, said at least three brackets disposed on a top of the top plate;
   at least one magnet;
   wherein said at least one magnet is disposed within said feet;
   alignment pockets, said alignment pockets disposed only on a top of the microbial air sampler within a recessed receiving portion of the microbial air sampler;
   wherein said top plate has a smaller diameter than that of said recessed receiving portion; and
   wherein said feet are configured to interface with said alignment pockets such that the top plate may not be moved laterally.

2. The component of claim 1, further comprising:
   ferromagnetic inserts;
   wherein said ferromagnetic inserts are disposed within said feet; and
   wherein said ferromagnetic inserts are attracted to a magnetic field of said magnet when the top plate is installed to the microbial air sampler.

3. The component of claim 2, wherein said alignment pockets serve to align said at least one magnet to said ferromagnetic inserts of said feet during installation such that the top plate assembly is ideally positioned without the use of tools.

4. The component of claim 1, wherein said sampling plate is a petri dish.

* * * * *